United States Patent [19]

Nakajima et al.

[11] Patent Number: 5,230,667
[45] Date of Patent: Jul. 27, 1993

[54] ARAMID FIBER CORD FOR POWER TRANSMISSION BELT AND METHOD OF MANUFACTURING THE SAME

[75] Inventors: Masayoshi Nakajima, Kobe; Takashi Kinoshita, Takasago, both of Japan

[73] Assignee: Mitsuboshi Belting Ltd., Nagata, Japan

[21] Appl. No.: 879,577

[22] Filed: May 7, 1992

[30] Foreign Application Priority Data

May 8, 1991 [JP] Japan ................... 3-133419

[51] Int. Cl.$^5$ ............................... F16G 1/10
[52] U.S. Cl. .......................... 474/263; 474/268
[58] Field of Search ............... 474/204, 205, 263, 268

[56] References Cited
U.S. PATENT DOCUMENTS

| | | | |
|---|---|---|---|
| 4,498,891 | 2/1985 | Mashimo et al. | 474/268 X |
| 4,721,496 | 1/1988 | Yokoyama | 474/263 X |
| 4,832,673 | 5/1989 | Nagai et al. | 474/263 |
| 5,116,286 | 5/1992 | Kinoshita et al. | 474/263 X |
| 5,120,280 | 6/1992 | Mizuno et al. | 474/263 X |

Primary Examiner—Thuy M. Bui
Attorney, Agent, or Firm—Wood, Phillips, Van Santen, Hoffman & Ertel

[57] ABSTRACT

An aramid fiber cord for use as a component in a power transmission belt, which aramid fiber cord has a plurality of aramid fiber filaments of 300 to 3100 denier adhesively treated and formed into a strand with a primary twist factor (Y) in a range of −1 to 1. A plurality of the strands are formed into the cord with a finishing twist factor (X) in a range of 1 to 4. The primary twist factor (Y) and finishing twist factor (X) satisfy the following equations: Y is $\geqq$ to $-0.6X+1.3$ and Y is $\geqq$ to $-1.5x+5.0$.

23 Claims, 3 Drawing Sheets

ARAMID FIBER CORD FOR POWER TRANSMISSION BELT AND METHOD OF MANUFACTURING THE SAME

BACKGROUND OF THE INVENTION

1. Field of the Invention

This invention relates to power transmission belts and, more particularly, to an aramid fiber cord for use as a load carrying component in a power transmission belt and having excellent resistance to elongation, flexing fatigue, and fraying.

2. Backqround Art

It is known to use aramid fiber cords as load carrying members in power transmission belts. The aramid fiber is an organic fiber that is strong and flexible and has good dimensional stability in high temperature environments as compared to other organic fibers. One drawback with load carrying cords made of aramid fiber is that the fibers have a tendency to fray. This is particularly a problem in belts in which the laterally oppositely facing drive/driven surfaces are exposed, i.e. do not have any covering layer, such as canvas, thereon. This situation is common in synchronous belts, V-ribbed belts, and V-belts. Fraying may occur at manufacture and/or during use as the exposed cords on the laterally facing surfaces repeatedly contact and disengage from a cooperating pulley.

Attempts have been made to alter the characteristics of the aramid fiber to make cords constructed therefrom more suitable as a component in a power transmission belt. It is known, for example, to treat the cords with a resorcinol formalin rubber latex adhesion liquid (hereinafter RFL liquid). Cords so treated have good bending strength, however are still prone to fraying.

It is also known to pre-treat the cords with epoxy or isocyanate compound before treatment with the RFL liquid. This results in the hardening of the cord, which alleviates much of the fraying problem. However, the hardened cord has less resistance to flexing fatigue than the cord does in the absence of this treatment. Accordingly, neither of the above treatments satisfactorily addresses both the problems of fraying and flexing fatigue.

One of the inventors herein, together with employees of the assignee of this invention, previously invented a manufacturing method in which the aramid fiber is treated with a mixture of epoxy compound, including at least one epoxy radical, and liquid rubber. The treated fibers are then adhesively vulcanized with unvulcanized rubber. While this method significantly improves the resistance of the aramid fibers to both flexing fatigue and fray, the adhesion between the fibers and rubber layer, in which they embed, has not proven as effective as desired. Consequently, there remains a need to develop a cord with excellent resistance to both fray and flexing fatigue and one which is effectively adhered to the rubber component layer of a power transmission belt in which it is embedded.

SUMMARY OF THE INVENTION

The present invention is specifically directed to overcoming the above-enumerated problems in a novel and simple manner.

More particularly, it is the principal objective of the present invention to provide a load carrying cord that can be incorporated into a power transmission belt and which has excellent resistance to elongation, flexing fatigue and fray, and which is at the same time positively adhered to the rubber component layer in which it is embedded.

To accomplish this end, the present invention comprehends an aramid fiber cord for use as a component in a power transmission belt, which aramid fiber cord has a plurality of aramid fiber filaments of 300 to 3100 denier adhesively treated and formed into a strand with a primary twist factor (Y) in a range of $-1$ to 1. A plurality of the strands are formed into the cord with a finishing twist factor (X) in a range of 1 to 4. The primary twist factor (Y) and finishing twist factor (X) satisfy the following equations: Y is $\geq$ to $-0.6X+1.3$ and Y is $\leq$ to $-1.5x+5.0$.

The invention also contemplates that the cord be adhesively treated with one of a) a combination of resorcinol formalin rubber latex adhesion liquid and rubber cement and b) rubber cement.

In one form, the aramid fiber filaments are treated with one of a) an epoxy compound and b) an isocyanate compound.

The invention contemplates the use of 100 to 3000 fiber filaments, of 1 to 3 denier each, in defining each aramid fiber strand.

In one form, the aramid fiber filaments are in the form of a ribbon.

The aramid fiber filaments are preferably made from one of CONEX TM, NOMEX TM, KEVLAR TM, TECHNORA TM, and TOWARON TM.

In one form, the aramid fiber cord is defined by 2 to 5 strands, as described above.

In one form, the rubber cement is one of a) chloroprene rubber, b) chlorosulfonated polyethylene and c) alkylated chlorosulfonated polyethylene. The rubber cement preferably has a solvent that is one of a) nitrile hydride rubber component, b) isocyanate compound, c) methyl ethyl ketone, and d) toluene.

In a preferred form, the resorcinol formalin rubber latex adhesion liquid includes latex that is one of a) styrene-butadiene-vinylpyridine terpolymer, b) chlorosulfonated polyethylene, c) nitrile hydride rubber, d) epichlorohydrine, e) natural rubber, f) butadiene-styrene rubber (SBR), g) chloroprene rubber and h) olefine-vinylester copolymer.

In one form, the resorcinol formalin rubber latex adhesion liquid is a mixture of initial condensates of resorcinol and formalin and rubber latex and the mole ratio of resorcinol to formalin is 1:0.5 to 3. In one form, the initial condensates of resorcinol and formalin are mixed with the rubber latex such that a resin portion thereof is present in the amount of 10 to 100 weight parts to 100 weight parts of rubber latex.

The invention further contemplates the combination of the aramid fiber cord and a belt body so as to define therewith a power transmission belt, with the aramid fiber cord being at least partially embedded in the belt body.

According to the invention, the power transmission belt has a length and a plurality of the aramid fiber cords are provided in the belt body and extend lengthwise therein to define a neutral axis for the power transmission belt. The belt may be any of a V-belt, a V-ribbed belt, a synchronous belt, etc.

In one form, the power transmission belt has laterally oppositely facing surfaces and the belt body has a cushion rubber layer in which the aramid fiber cords are embedded The cushion rubber layer defines a portion of each laterally facing surface and the portion of the laterally facing surface is not covered by fabric.

The invention also contemplates an aramid fiber cord having a plurality of aramid fiber filaments of 300 to 3100 denier formed into a strand with a primary twist factor (Y), with a plurality of the strands being formed into the cord with a finishing twist factor (X). The primary twist factor (Y) and finishing twist factor (X) satisfy the following equations: Y is $\geq$ to $-0.6X+1.3$ and Y is $\leq$ to $-1.5X+5.0$.

The invention further contemplates a method of forming an aramid fiber cord, which method consists of the steps of adhesively treating a plurality of aramid fiber filaments of 30 to 3100 denier, twisting the plurality of filaments with a primary twist factor (Y) in a range of $-1$ to 1 into a strand, and forming a plurality of the strands into the cord with a finishing twist factor (X) in a range of 1 to 4.

DETAILED DESCRIPTION OF THE DRAWINGS

Figure 1:
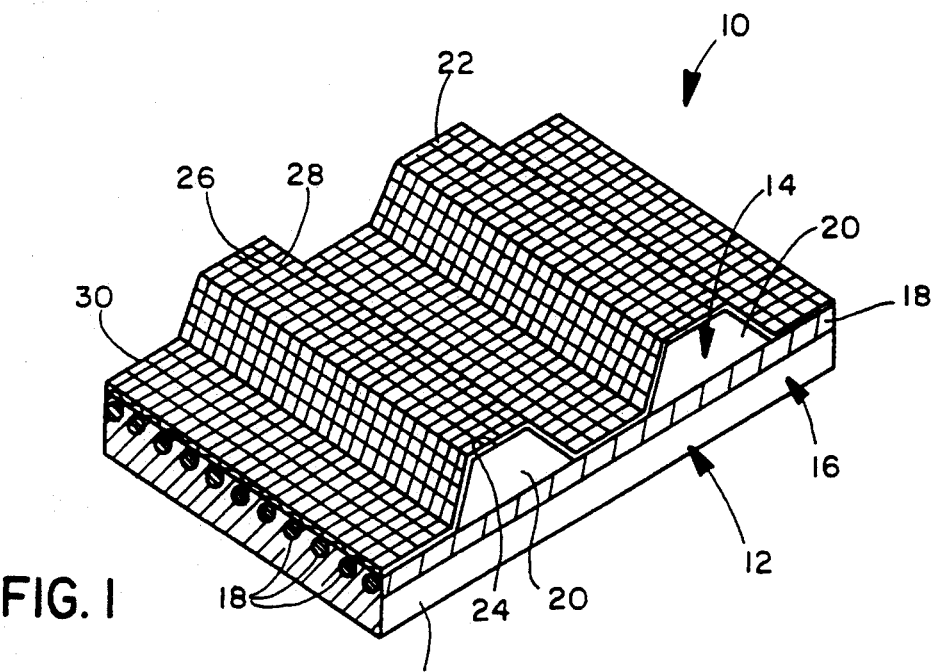
FIG. 1 is a sectional perspective view of a synchronous belt made according to the present invention.

A synchronous belt, made according to the present invention, is shown at 10 in FIG. 1. The belt 10 has a belt body 12 with a compression section 14, a tension section 16, and a neutral axis defined by a plurality of longitudinally extending, load carrying cords 18. A plurality of laterally extending teeth 20 are provided at regularly spaced intervals longitudinally of the belt 10. A canvas layer 22 is adhered to and covers the inside surface 24 of the belt 10, including the belt teeth 20.

The compression and tension sections 14, 16, respectively, are made of chloroprene rubber (CR), chlorosulfonated polyethylene rubber (CSM), alkylated chlorosulfonated polyethylene (ACSM), or hydrogenated acrylonitrile-butadiene rubber (referred to also as hydrogenated nitrile rubber and hereinafter abbreviated as H-NBR). The H-NBR rubber is made by adding more than 80 weight percent of hydrogen to the double bonding part of acrylonitrile-butadiene rubber. The H-NBR rubber has good resistance to deterioration at high temperatures.

The canvas cover 22 may be a plain weave fabric, twill weave fabric, satin fabric, or another fabric that is expandable in the weft direction, i.e. the longitudinal direction of the belt. In the case of plain weave fabric, the weft yarns 26 and warp yarns 28 are interwoven to pass alternatingly one above the other at every point of intersection. Accordingly, wave-like crossings are formed in both the warp and weft directions.

On the other hand, where twill or satin canvas are used, the warp yarns 28 and weft yarns 26 are alternatingly passed over and under one another at larger intervals. This reduces the number of wave-like crossings. Resultingly, the rubber used to impregnate the canvas not only fills the voids between the yarns but also fills in between the warp yarns 28 and weft yarns 26 at certain of the points of crossing. The rubber between the warp yarns 28 and weft yarns 26, at certain of these points of crossing, thereby prevents direct engagement and abrasion between the warp yarns 28 and weft yarns 26 during bending. The result is that the twill and satin canvases generally have a longer life than the normal plain weave canvas.

In the canvas cover 22, the weft yarns 26 and warp yarns 28 are initially coated with an adhesion layer made of cured of RFL liquid, isocyanate solution, or epoxy solution. The canvas cover 22 is made from one of polyamide fiber, polyester fiber, aromatic polyester fiber, or the like.

The load carrying cords 18 are made from aramid fiber. A raw strand of yarn of 300 to 3100 denier is made by bundling 100 to 3000 aromatic polyamide fibers of 1 to 3 denier. Prior to twisting the individual fibers, the fibers are adhesively treated with one of epoxy compound or isocyanate compound. The liquid treatment results in a maintenance of the integrity of the bound fibers, i.e. prevents fraying of the cord 18. The individual filaments are preferably formed in the configuration of a ribbon.

If the filaments are twisted in a conventional manner, twisting generally becomes non-uniform. This results in a weakening of the cords and lowering of the resistance to flex fatigue. The present invention overcomes these problems by identifying a range of a finishing twist factor (X) and a primary twist factor (Y). More particularly, the raw yarns are first twisted at the primary twist factor (Y) in a range of 0 to 1 to define a strand. At least two such strands, and preferably 2 to 5 such strands, are twisted at the finishing twist factor (X) in a range of 1 to 4.

The twist factors (X, Y) according to the invention, are calculated using the following equation:

$$TF = 3.48 \times 0.01 \times T \times \sqrt{D}.$$

The directions of the primary twist and the finishing twist may be the same or opposite.

Where the primary and finishing twist directions are the same, the primary twist factor (Y) is in the range of 0 to 1. In the case where the primary twist direction is opposite to the finishing twist direction, the primary twist factor (Y) is in the range of 0 to $-1$. In each case, the number of twists is the same.

After being treated with RFL liquid, the twisted strands are overcoated with rubber cement. Alternatively, the strands are treated only with rubber cement. The adhesion treatment using rubber cement may be repeated several times as need dictates.

The RFL liquid used is a mixture of initial condensates of resorcinol and formalin with rubber latex. It is preferred to set a mole ratio of resorcinol to formalin at 1:0.5 to 3 to enhance adhesive strength. The initial condensates of resorcinol and formalin are mixed with the latex in such a manner that a resin portion thereof accounts for 10 to 100 weight parts per 100 weight parts of rubber latex. The total solid concentration is then adjusted to be within a range of 5 to 40%.

The latex is any of a) styrene-butadiene-vinylpyridine terpolymer, b) chlorosulfonated polyethylene, c) nitrile hydride rubber, d) epichlorohydrine, e) natural rubber, f) butadiene-styrene rubber (SBR), g) chloroprene rubber and h) olefine-vinylester copolymer, etc.

The rubber cement for the overcoat treatment is a rubber component that adheres positively to the rubber in the tension section 16. Suitable rubbers are chloroprene rubber, chlorosulfonated polyethylene, and alkylated chlorosulfonated polyethylene. Suitable solvents include nitrile hydride rubber component, isocyanate compound, methyl ethyl ketone, and toluene.

The aramid fiber making up the cords 18 may be an aramid fiber having an aromatic ring in a principal chain in the molecular structure. Commercially available aramid fibers, suitable for this purpose, are sold under the trademarks CONEX TM, NOMEX TM, KEVLAR TM, TECHNORA TM, and TOWARON TM, etc.

According to the invention, the desired strength and resistance to elongation and flexing fatigue for the cords 18, and the belt 10 in which the cords 18 are incorporated, are realized with the finishing twist factor (X) and primary twist factor (Y) satisfying the following two equations: Y is $\geq$ to $-0.6X+1.3$ and Y is $\leq$ to $-1.5x+5.0$.

It has been found that if Y is less than $-0.6X+1.3$, the flexing fatigue resistance of the belt deteriorates undesirably. On the other hand, the strength of the belt is diminished and the elongation thereof increased if Y is greater than $-1.5X+5.0$. If, in the equations, Y becomes a negative number, it indicates that the primary twist direction is opposite to the finishing twist direction.

The inventive cord 18 is particularly desirable where it is exposed at the laterally oppositely facing surfaces 30, 32 of the belt 10.

Figure 2:
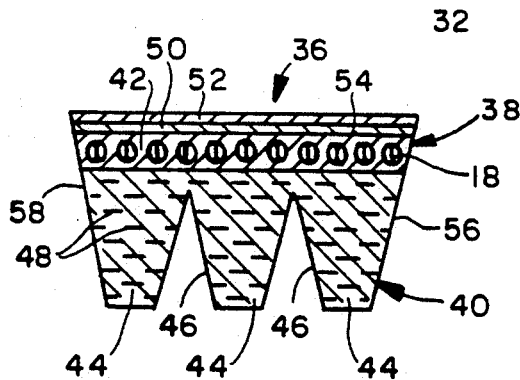
FIG. 2 is a cross-sectional view of a V-ribbed belt made according to the present invention.

The inventive cord 18 is equally effective when incorporated into a V-ribbed belt as shown at 36 in FIG. 2. The belt 36 has a tension section 38, a compression section 40 and a neutral axis defined between the tension and compression sections 38, 40 by a plurality of load carrying cords 18, as previously described. The cords 18 are embedded in a cushion/adhesive rubber layer 42. A plurality of longitudinally extending, laterally spaced ribs 44 are defined in the belt compression section 40. The ribs 44 are defined by V-shaped cut-outs 46 between adjacent ribs 44. The ribs 44, which have discrete, reinforcing fibers 48 embedded therein, are relatively thin in a vertical direction and are therefore prone to stretching during use, which stretching is resisted by the load carrying cords 18. Rubberized canvas layers 50, 52 are adhered to the outer surface 54 of the cushion/adhesive rubber layer 42. Laterally oppositely facing side surfaces 56, 58 are not covered by any fabric so that the load carrying cords 18 may be exposed thereat with the belt 36 manufactured by conventional techniques.

Figure 3:
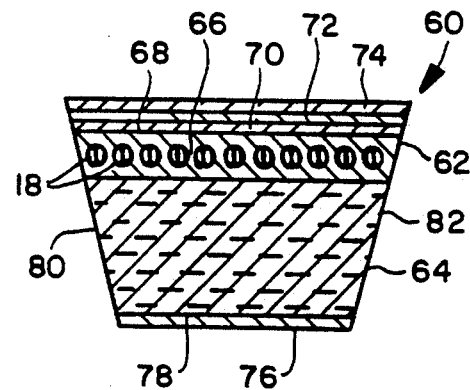
FIG. 3 is a cross-sectional view of a V-belt made according to the present invention.
Figure 4:
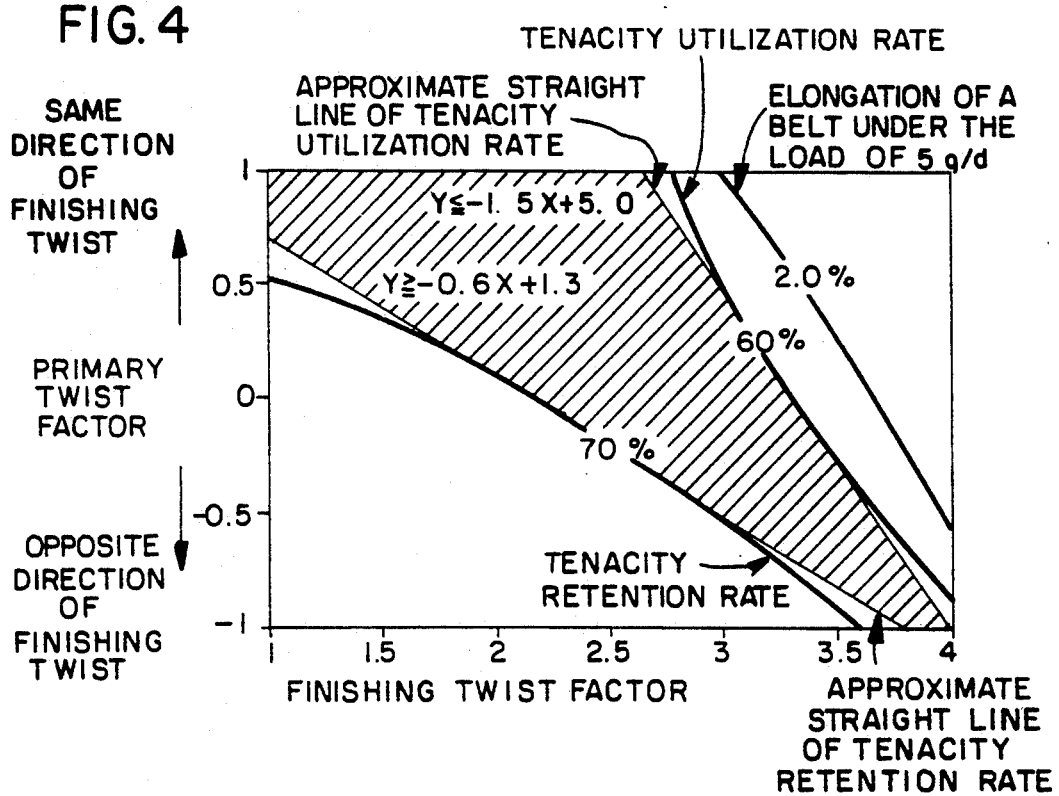
FIG. 4 is a graph showing optimum regions of elongation of a belt under a 5g/d load, and the tenacity utilization rate and tenacity retention rate of the belt in relation to a primary twist factor and a finishing twist factor.
Figure 5:
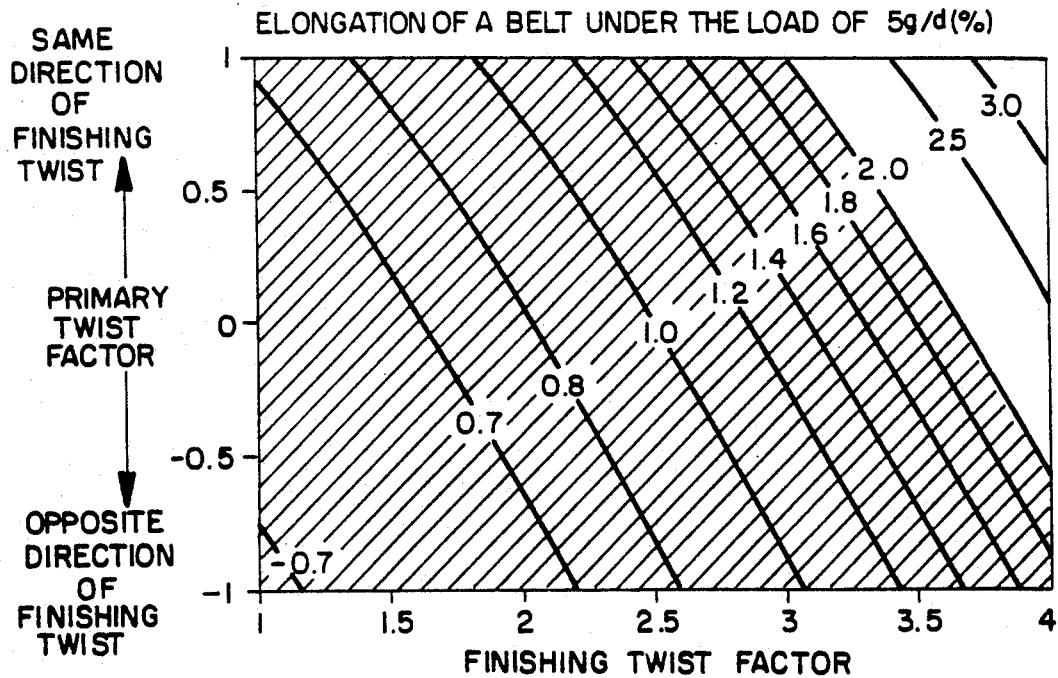
FIG. 5 is a graph showing a contour line of the elongation of a belt under a 5g/d load in relation to the primary twist factor and finishing twist factor.
Figure 6:
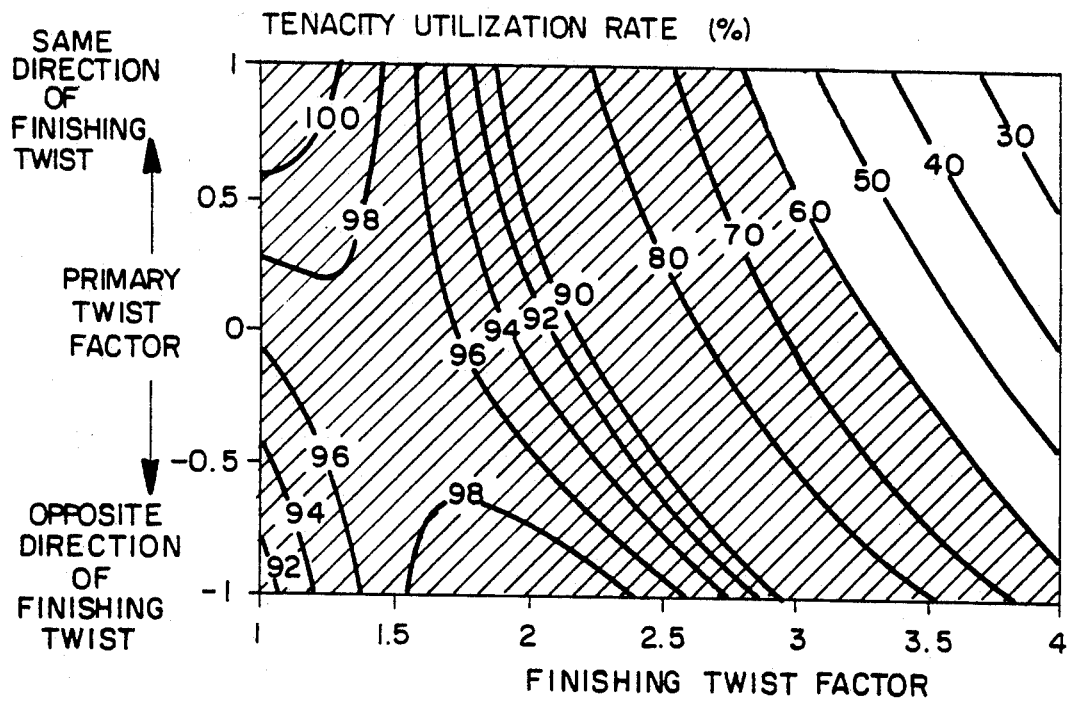
FIG. 6 is a graph showing a contour line of the tenacity utilization rate of the belt in relation to the primary twist factor and the finishing twist factor.
Figure 7:
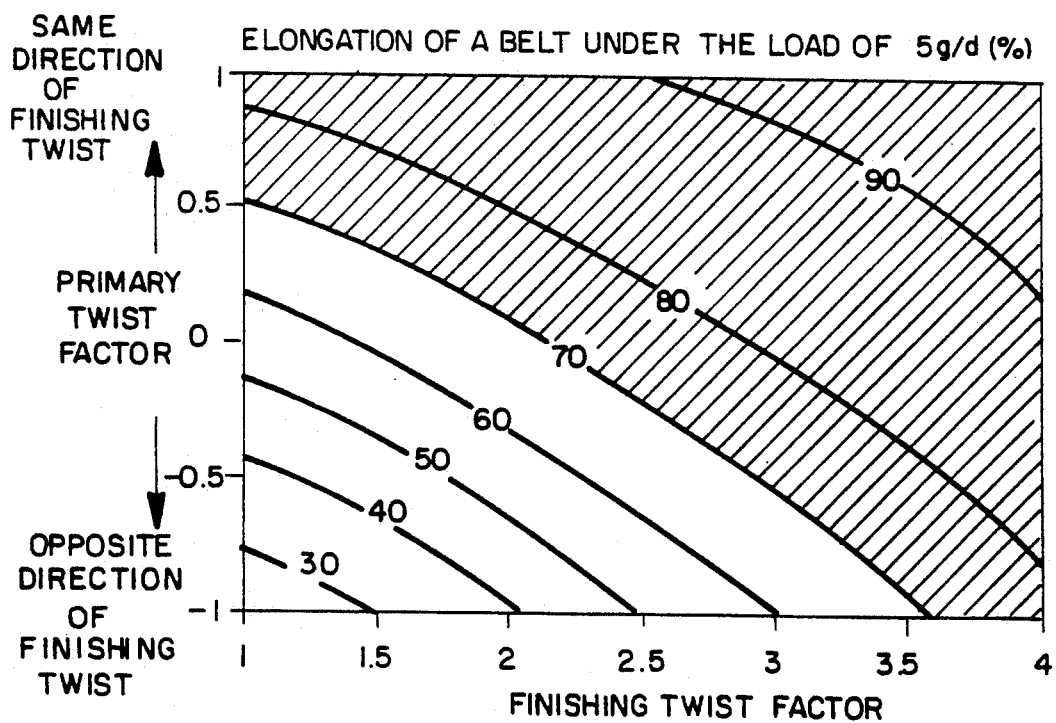
FIG. 7 is a graph showing a contour line of the tenacity retention rate of the belt during a running test in relation to the primary twist factor and the finishing twist factor.

A still further type of belt, made according to the present invention, is shown at 60 in FIG. 3. The belt 60 is a V-belt having tension and compression sections 62, 64, respectively, with the netural axis of the belt defined by the cords 18. The cords 18 are embedded in a cushion/adhesive rubber layer 66, the outer surface 68 of which is covered by rubberized canvas layers 70, 72, 74, adhered to the layer 76 and each other. A rubberized canvas layer 76 is also provided on the bottom surface 78 of the compression section 64.

The side surfaces 80, 82 are defined by the exposed rubber making up the cushion rubber layer 66 and the compression section 64. Consequently, the cords 18 may be exposed, as with the belt 10 shown in FIG. 1.

To construct a belt, according to the present invention, the aramid fibers, in the form of filaments, are adhesively treated with either epoxy compound or isocyanate compound. This secures the individual filaments positively in bundles/strands. By so doing, the problem of fray is substantially eliminated. The adhesively treated filaments harden in the form of a ribbon.

After being treated with RFL liquid, the individual strands are overcoated with rubber cement. Alternatively, the strands are treated only with rubber cement. This improves adhesion between the cords 18 and the rubber layers in which they are embedded and further eliminates the tendency of the cords 18 to fray.

The cords 18 are then incorporated into a belt body to define therewith a power transmission belt having any desired configuration. The cords 18 are very strong and resist elongation and flexing fatigue. Further, the cords 18 can be positively adhered to the rubber sections in which they are embedded. At the same time, the problem of fraying is overcome, particularly at the exposed lateral faces of the belt. The result of this is that the life of the inventive belt is substantially extended.

Embodiments of the present invention, as described below, were tested to demonstrate the superiority of performance of the inventive belts.

Embodiment 1

After being immersed in a treatment liquid including the components A, as shown in Table 1, below, untwisted aramid fiber filaments (TECHNORA TM, made by Teijin Corp.) of 1500 denier were heated at 200° C. for one minute.

TABLE 1

| Component | | A | B |
|---|---|---|---|
| PAPI-135 | *1 | — | 5 |
| EPICOAT 828 | *2 | 4 | — |
| DMP-30 | *3 | 1 | — |
| Toluene | | 95 | 95 |
| Total | | 100 | 100 |

*1 M. D. Kasei Corp. polyisocyanate compound
*2 Shell Chemicals Corp. epoxy compound
*3 2,4,6-trisdimethylaminomethylphenol The untwisted filaments were twisted at a primary twist factor (Y) of $-1$ to 1 to define individual strands (the negative factors indicating that the finishing twist direction is opposite to the primary twist direction). Two of the strands were bundled and twisted at a finishing twist factor (X) of 1 to 4 into a cord. The cord was then immersed in RFL liquid including the components shown in Table 2.

TABLE 2

| Component | Parts by Weight |
|---|---|
| CR latex | 100 |
| Resorcin | 14.6 |
| Formalin | 9.2 |
| Caustic soda | 1.5 |
| Water | 262.5 |

TABLE 2-continued

| Component | Parts by Weight |
| --- | --- |
| Total | 387.8 |

The resulting cord was heated at 200° C. for two minutes. Thereafter, the cord was immersed in the rubber cement having components shown in Tables 3 and 4, and then heated at 200° C. for two minutes.

TABLE 3

| Component | Parts by Weight |
| --- | --- |
| Chloroprene rubber | 100 |
| Magnesia | 4 |
| Zinc oxide | 15 |
| Accelerator *4 | 2 |
| Sulfur | 0.5 |
| Antioxidant *5 | 2 |
| Carbon black | 65 |
| Oil | 8 |
| Total | 196.5 |

*4 N-N'-diethylthiuramthiourea
*5 octylated-diphenylamine

TABLE 4

| Component | Parts by Weight |
| --- | --- |
| Rubber Composition (Table 3) | 100 |
| Methylenediisocyanate | 20 |
| Toluene | 1080 |
| Total | 1200 |

Combinations of the primary twist factor (Y) and finishing twist factor (X) for the test cords in this embodiment were: (0, 1), (0.5, 1.5), (−0.5, 1.5), (1, 2), (0, 2), (−1, 2), (0.5, 2.5), (−0.5, 2.5), (1, 3), (0, 3), (−1, 3), (0.5, 3.5), (−0.5, 3.5), and (0,4).

The cover canvas was twill weave fabric using 6.6 nylon wooly finished yarns as wefts and 6.6 nylon yarns for industrial use as warps and having a thickness of 0.25 mm and 0.30 mm in cross section. An adhesive treatment, suitable for the rubber in the teeth, was applied to the cover canvas. The tooth rubber and tension section rubber were made of rubber components shown in Table 3, with chloroprene rubber as the main material.

A synchronous belt was fabricated using the aforementioned materials in accordance with a conventional press-fit method. The resulting belt was an STPD tooth type, with a tooth pitch of 8 mm. The number of teeth on the belt was 99, and the width of the belt was 19.1 mm.

The elongation of the belt was measured under a load of 5g/d. The tensile strength was measured before and after a running test.

The belt was tested on an apparatus with a drive pulley having 24 teeth and three driven pulleys, each having 24 teeth, arranged up and down and left and right so as to oppose each other. An idler pulley having a 32 mm diameter was placed between the drive and driven pulleys. The belt was trained around the four pulleys and was subjected to a tensile force by placing a load of 40 kgf on one of the driven pulleys. The drive pulley was operated at 5500 rpm at room temperature for 200 hours. The tensile strength of the belt was measured after 200 hours of running. Various measurements were taken, including the primary twist factor (Y), finishing twist factor (X), the elongation of the belt under 5g/d load, the tenacity utilization rate, and the tenacity retention rate of the belt. In addition, contour lines were derived for certain of these measurements in relation to the primary twist factor (Y) and finishing twist factor (X) according to the Box Wilson method. The results are shown in the graphs in FIGS. 4-7.

The tenacity utilization rate (%) is a value obtained by dividing the tenacity of the strength of the belt (kg) before the running tests by the tenacity of the filaments (g/d). The tenacity retention rate (%) is the value obtained by dividing the strength of the belt (kg) after the running test by the strength of the belt (kg) before the running test.

Embodiment 2

After being immersed in a treatment liquid shown in Table 5 below, untwisted aramid fiber filaments (TECHNORA TM, fabricated by Teijin Corp.) of 1500 denier were heated to 200° C. for one minute. The untwisted filaments were twisted at a primary twist factor (Y) of 0.5 in the same direction as the finishing twist direction to define a strand. Two of the strands were bundled and twisted at the finishing twist factor (X) of 2.5 to define a cord. The cord was immersed in an RFL liquid as shown in Table 5, below, and then treated with rubber cement.

TABLE 5

| | Example | | | Comparison | |
| --- | --- | --- | --- | --- | --- |
| Cord No. | A | B | C | D | E |
| Form of fiber in first treatment liquid | Filament | | | Twisted Cord | |
| Treatment condition in first treatment liquid | Table 1A 200° C. × 1 min. | Table 1B 200° C. × 1 min. | Table 1A 200° C. × 1 min. | Table 1A 200° C. × 2 min. | RFL 200° C. × 2 min. |
| Treatment condition in second treatment liquid | RFL 200° C. × 2 min. | RFL 200° C. × 2 min. | Rubber Cement 200° C. × 2 min. | Rubber Cement 200° C. × 2 min. | Rubber Cement 200° C. × 2 min. |
| Treatment condition in third treatment liquid | Rubber cement 200° C. × 2 min. | Rubber cement 200° C. × 2 min. | — | Rubber cement 200° C. × 2 min. | — |
| Tenacity utilization rate (%) | 77 | 77 | 78 | 76 | 79 |
| Peeling (Kg/25 mm) | 35.6 | 35.2 | 33.4 | 34.7 | 15.1 |
| Fray | A | A | A | B | E |
| Tenacity retention rate (%) | 84 | 84 | 85 | 62 | 85 |

Fray A (good) ... E (bad)

Alternatively, the cord could be treated with only rubber cement. Cords A, B and C were obtained.

The same filaments were twisted at the primary twist factor (Y) of 0.5 in the same direction as the finishing twist direction to be formed into a strand. Two of the strands were bundled and twisted at the finishing twist factor (X) of 2.5 to define a cord. The cords were treated in the manner as shown in Table 5 to obtain cords D and E.

As in the first embodiment, described above, a synchronous belt was fabricated with a tooth pitch of 8 mm, 99 teeth, and a width of 19.1 mm. Test results for this belt are shown in Table 5.

The flat peeling strength shown in Table 5 was measured in accordance with JISK6854 (T-type peeling test). The fray of the cord was determined in five stages (A, B, C, D, E) by inspecting how loose the cord exposed at the side surfaces of the belt was.

As can be seen from the results, the cord and belt demonstrated satisfactory flexing fatigue resistance. The belt fabricated by adhesively treating the twisted cords did not demonstrate the improved fray.

As described above, an aramid fiber cord, according to the invention, is fabricated by adhesively treating aramid fibers in the form of filaments with liquid that is one of an epoxy compound and isocyanate compound. With this treatment, the filaments are firmly bundled, thereby remedying the fray of the cord. At the same time, the cord performs satisfactorily in terms of strength and elongation and flexing fatigue resistance so long as the primary twist factor (Y) and finishing twist factor (X) lie within the range as previously described.

Because transmission belts using the inventive cords also have an improved flexing fatigue resistance, the life of such belts is extended.

The foregoing disclosure of specific embodiments is intended to be illustrative of the broad concepts comprehended by the invention.

We claim:

1. An aramid fiber cord for use as a component in a power transmission belt, said aramid fiber cord comprising:

a plurality of aramid fiber filaments of 300 to 3100 denier adhesively treated and formed into a strand with a primary twist factor (Y) in a range of $-1$ to 1, a plurality of said strands being formed into said cord with a finishing twist factor (X) in a range of 1 to 4, wherein said primary twist factor (Y) and finishing twist factor (X) satisfy the following equations:

$$Y \geq -0.6X + 1.3$$

$$Y \leq -1.5X + 5.0.$$

2. The aramid fiber cord according to claim 1 wherein the cord is adhesively treated with one of a) a combination of resorcinol formalin rubber latex adhesion liquid and rubber cement and b) rubber cement.

3. The aramid fiber cord according to claim 1 wherein the aramid fiber filaments are treated with one of a) an epoxy compound and b) an isocyanate compound 4. The aramid fiber cord according to claim 1 in combination with a belt body so that the cord and belt body define a power transmission belt, said aramid fiber cord being at least partially embedded in the belt body.

5. The aramid fiber cord according to claim 4 wherein the power transmission belt has a length and a plurality of the aramid fiber cords are provided in the belt body and extend lengthwise therein to define a neutral axis for the power transmission belt.

6. The aramid fiber cord according to claim 5 wherein the power transmission belt is one of a V-belt, a V-ribbed belt and a synchronous belt.

7. The aramid fiber cord according to claim 6 wherein the power transmission belt has laterally oppositely facing surfaces, the belt body has a cushion rubber layer in which the aramid fiber cords are embedded, the cushion rubber layer defines a portion of each said laterally facing surface and the portion of the laterally facing surfaces is not covered by fabric.

8. The aramid fiber cord according to claim 1 wherein there are between 100 to 3000 fiber filaments of 1 to 3 denier defining each said strand 9. The aramid fiber cord according to claim 2 wherein the rubber cement is one of a) chloroprene rubber, b) chlorosulfonated polyethylene, and c) alkylated chlorosulfonated polyethylene.

10. The aramid fiber cord according to claim 9 wherein the rubber cement includes a solvent that is one of a) a nitrile hydride rubber component, b) an isocyanate compound, c) methyl ethyl ketone, and d) toluene.

11. The aramid fiber cord according to claim 1 wherein the aramid fiber filaments are made from one of CONEX ™, NOMEX ™, KEVLAR ™, TECHNORA ™, and TOWARON ™.

12. The aramid fiber cord according to claim 1 wherein the aramid fiber cord is defined by 2 to 5 of said strands.

13. The aramid fiber cord according to claim 2 wherein the resorcinol formalin rubber latex adhesion liquid includes latex that is one of a) styrene-butadiene-vinylpyridine terolymer, b) chlorosulfonated polyethylene, c) nitrile hydride rubber, d) epichlorohydrine, e) natural rubber, f) butadiene-styrene rubber (SBR), g) chloroprene rubber and h) olefine-vinylester copolymer.

14. The aramid fiber cord according to claim 2 wherein the resorcinol formalin rubber latex adhesion liquid is a mixture of initial condensates of resorcinol and formalin and rubber latex and the mole ratio of resorcinol to formalin is 1:0.5 to 3.

15. The aramid fiber cord according to claim 14 wherein the initial condensates of resorcinol and formalin are mixed with the rubber latex such that a resin portion thereof is present in the amount of 10 to 100 weight parts to 100 weight parts of rubber latex.

16. The aramid fiber cord according to claim 1 wherein the aramid fiber filaments are in the form of a ribbon.

17. An aramid fiber cord for use as a component in a power transmission belt, said aramid fiber cord comprising:

a plurality of aramid fiber filaments of 300 to 3100 denier adhesively treated and formed into a strand with a primary twist factor (Y), a plurality of said strands being formed into said cord with a finishing twist factor (X), wherein said primary twist factor (Y) and finishing twist factor (X) satisfy the following equations:

$$Y \geq -0.6X + 1.3$$

$$Y \leq -1.5X + 5.0.$$

18. The aramid fiber cord according to claim 17 wherein the primary twist factor (Y) is in a range of $-1$ to 1 and the finishing twist factor (X) is in a range of 1 to 4, 19. A method of forming an aramid fiber cord for use as a component in a power transmission belt, said method comprising the steps of:
   adhesively treating a plurality of aramid fiber filaments of 300 to 3100 denier;
   twisting the plurality of aramid fiber filaments with a primary twist factor (Y) in a range of $-1$ to 1 into a strand; and
   forming a plurality of said strand s into said cord with a finishing twist factor (X) in a range of 1 to 4,
   wherein said primary twist factor (Y) and finishing twist factor (X) satisfy the following equations:

$$Y \geq -0.6X + 1.3$$

$$Y \leq -1.5X + 5.0.$$

20. The method of forming an aramid fiber cord according to claim 19 wherein said step of adhesively treating the aramid fiber filaments comprises the step of adhesively treating the aramid fiber filaments with one of a) an epoxy compound and b) an isocyanate compound before twisting the aramid fiber filaments.

21. The method of forming an aramid fiber cord according to claim 19 including the step of adhesively treating the cord with one of a) a combination of resorcinol formalin rubber latex adhesion liquid and rubber cement and b) rubber cement.

22. The method of forming an aramid fiber cord according to claim 19 including the step of incorporating the cord into a belt body to define therewith a power transmission belt wherein the cord defines a neutral axis for the power transmission belt.

23. The method of forming an aramid fiber cord according to claim 22 including the step of forming the belt body from rubber to define exposed laterally oppositely facing side surfaces.

* * * * *